May 5, 1970 G. F. GAERTTNER III, ETAL 3,510,603
DIGIT CARRIER RECORDING SYSTEM
Filed March 8, 1967
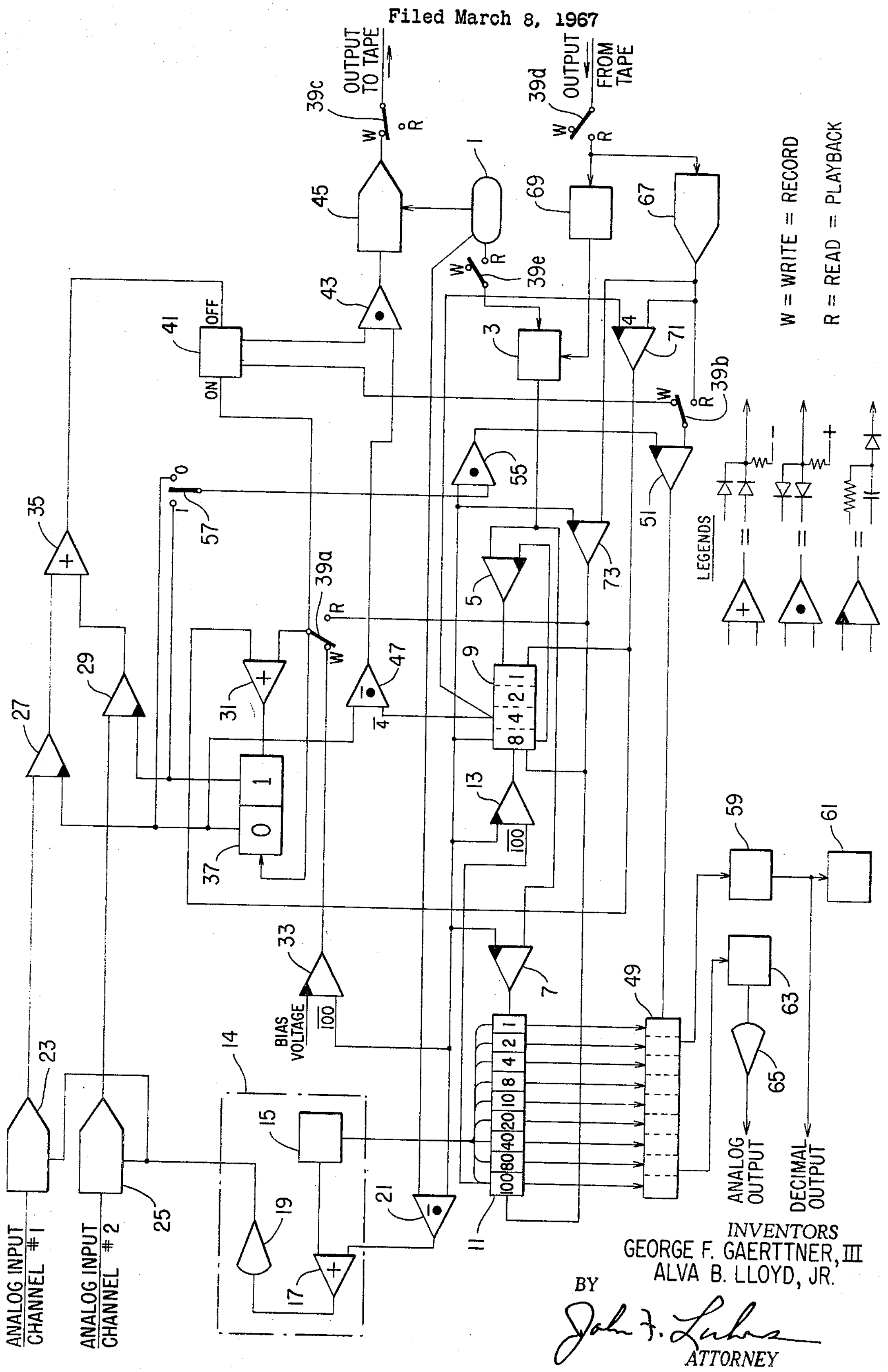
INVENTORS
GEORGE F. GAERTTNER, III
ALVA B. LLOYD, JR.
BY John F. Lukas
ATTORNEY United States Patent Office
3,510,603
Patented May 5, 1970

3,510,603
DIGIT CARRIER RECORDING SYSTEM

George F. Gaerttner III and Alva B. Lloyd, Jr., Lynchburg, Va., assignors to The Babcock & Wilcox Company, New York, N.Y., a corporation of New Jersey Filed Mar. 8, 1967, Ser. No. 621,611
Int. Cl. H03k *13/07;* G11b *5/02*
U.S. Cl. 179—100.2 6 Claims

ABSTRACT OF THE DISCLOSURE

An apparatus for representing the magnitude of multiple analog input signals on magnetic tape, where oscillator cycles are gated to a conventional tape system such that each analog input signal is stored serially as a series of oscillator cycles, the number of which is controlled logically as a function of the magnitude of the analog input signal. The stored data is individually addressed by a predetermined number of oscillator cycles such that during playback of the recorded data, selected input channels may be distinguished and converted to digital and analog outputs.

BACKGROUND OF THE INVENTION

Field of the invention

This invention relates to a data recording system and more particularly to a magnetic tape data recording system.

Description of the prior art

The frequency-modulated and pulse-modulated magnetic tape data recording systems demanded by military and aerospace programs fail to provide a system suitable for programs of limited budget and less stringent operational demands. These sophisticated systems necessitate the use of expensive tape transports as well as expensive readout equipment in order to insure the required frequency response and accuracy.

The data recording apparatus which is the subject of this invention provides a system capable of recording low frequency data at a fraction of the cost of the systems currently available. The subject invention provides integral solid-state multiplexing and a method to record and play back data which is insensitive to fluctuation in tape speed. This latter feature, which is not present in frequency sensitive systems, permits high speed data recording with the option of playing back the data at a speed compatible with selected digital or analog readout apparatus.

SUMMARY OF THE INVENTION

This portable data acquisition system scans, digitizes and serially records on a commercial tape recorder, data from multiple analog inputs. The system provides outputs such that the data may later be "played back" and selectively displayed in digital and analog representation. The solid-state circuitry comprising the data acquisition and conditioning portion of the system generates bursts of electrical impulses for each of the analog inputs. Each burst represents a value of a measured process variable such as temperature or pressure. The burst duration or number of impulses in a burst is directly proportional to the process variable. The burst representing each analog input is addressed and recorded on the tape recorder. When it is desirous to analyze or inspect the data, the tape is "played back" and the impulses per burst are counted and converted to both digital and analog representation as required. It should be noted that the system is not limited to single-track recording or to entertainment-type tape recorders.

Brief description of the drawing

The drawing is a functional block illustration of a digit carrier recording system embodying our invention.

DESCRIPTION OF THE PREFERRED EMBODIMENT

Wth reference to the drawing, the invention is illustrated as consisting of only two analog data input channels, channels 1 and 2, to insure a clear and concise understanding of the invention. These analog input signals represent measurements of process variables such as temperature and pressure. The number of analog input channels that may be recorded can be readily increased by merely adding additional identical circuit components. Therefore, the discussion which follows is directly applicable to a system consisting of more than two analog inputs.

OPERATION AND CONSTRUCTION OF RECORD SYSTEM

Referring to the schematic illustration, the oscillator 1 produces a sine wave which forms the basic carrier for the system in the write mode of operation. The frequency of this carrier determines the frequency response of the system with the only limitation being the capability of the magnetic tape portion of the system to respond to the carrier. The oscillator 1 frequency may be, for example, ten (10) kilohertz/sec. The blocking oscillator 3 serves as a pulse shaper to convert the sinusoidal output of oscillator 1 to trigger pulses of the same frequency. The transmission of said trigger pulses is controlled by gates 5 and 7.

The first eight pulses from the blocking oscillator 3 pass through gate 5 causing the pre-counter 9 to count to eight. When the pre-counter 9 reaches a count of eight, gate 5 is closed and gate 7 is opened. The ninth count from the blocking oscillator 3 is the first trigger pulse to pass through gate 7 and reach the counter 11. Counter 11 will count up to a maximum of one hundred and ninety-nine counts. When the counter 11 receives the two hundredth pulse through gate 7, it automatically resets to zero causing gate 13 to reset the pre-counter 9 to zero which in turn results in gate 5 opening and gate 7 closing. The counting cycle can now be repeated in the manner just described. The selection of a two hundred count counter is arbitrary and has been selected for the purpose of discussion.

The counter 11 is the driving means of staircase generator 14, said generator 14 consisting of a digital to analog converter 15, a gate 17 and an amplifier 19. The magnitude of the voltage produced at the output of amplifier 19 by the staircase generator 14 is determined by the count value in the counter 11. A clamping network 21 provides a means to clamp the staircase voltage during the pre-count of eight period and at the times the counter 11 is changing value. This clamping action, which eliminates false comparator output pulses due to transients occurring when counter 11 is changing value, modifies the staircase and causes it to take on the appearance of a bar graph.

The value of the two analog input voltages illustrated in the drawing, and any additional analog inputs which might be present in a system such as this, are measured once in every writing cycle. A writing cycle is defined as a complete count through the pre-counter 9 and the counter 11.

The comparators 23, 25 which accept analog inputs 1 and 2 respectively, also accept in common the staircase voltage output of amplifier 19. Therefore, during each writing cycle, the comparators compare their respective analog inputs to the voltage signal generated at amplifier 19 by the operation of counter 11. When the comparator analog voltage input is equaled by the amplifier 19 output, the comparator produces an output signal. Therefore, each comparator will have an output for each writing cycle.

The outputs of comparators 23 and 25 are applied to gates 27 and 29 respectively, which gates are opened and closed by frame counter 37. Frame counter 37 is controlled by the output of gate 33, which output occurs at the beginning of each writing cycle.

A bias voltage is maintained at the input to gate 33, while the triggering input to gate 33 receives its signal from the NOT side of the 100 stage of counter 11. The output of gate 33 controls the frame counter 37 through the read-write selector switch 39*a* to the zero side of the frame counter 37 and through gate 31 to the one side of the frame counter 37. At the beginning of each writing cycle, the frame counter 37 will reverse so that on one writing cycle gate 27 is open and gate 29 is closed and on the next writing cycle gate 27 is closed and gate 29 is open, etc. At the output of gate 35, which accepts the output of gates 27 and 29, will appear the output of comparators 23 and 25 on alternate writing cycles. The number of analog channels that may be serially recorded can be increased by adding additional comparators, additional gates of which 27 and 29 are typical, additional inputs to gate 35, additional positions of the channel selector switch 57 and increasing the counting capacity of frame counter 37. Additional expansion of system components would permit recording data on each track of a multi-track recorder.

The circuit described thus far monitors the analog voltage of each comparator unit and sequentially gates the comparator outputs through gate 35. The analog input signals are recorded on magnetic tape in the form of a burst of oscillator cycles, the number of cycles in the burst bearing a direct relationship to the magnitude of the analog signal. The writing bursts for recording on the tape are generated by oscillator 1 and gated through gate 45 to the tape recorder by the control gates 41 and 43. Gate 45 is normally closed preventing the sine wave output of oscillator 1 from reaching the tape recorder.

Gate 41 is a flip-flop circuit which is controlled by the outputs of gate 33 and gate 35. Gated flip-flop 41 is turned on at the beginning of each writing cycle by the output of gate 33 and turned off by the output of gate 35. Flip-flop 41, operating through gate 43, can open gate 45 thus allowing the output of oscillator 1 to reach the tape recorder. The number of cycles from oscillator 1 which is permitted to pass through gate 45 to the tape recorder will be eight pre-count cycles plus a number of cycles determined by the analog value.

The length of the data bursts that are alternately recorded on the tape represent the value of analog voltage inputs to comparators 23 and 25. So that they may be sorted as they are read off the tape an address for analog channel 1 will be generated and applied to the writing bursts associated with said analog channel. Gate 47, operating through gate 43, can prevent the oscillator 1 output from appearing at the output of gate 45. Gate 47 has an input from the pre-counter 9 that only appears during the four oscillator 1 cycles 5 through 8 on every writing cycle. The other input to gate 47 is from the frame counter 37 which appears only during those writing cycles in which gate 27 is open. The result is that every recorded burst associated with analog channel 1 signals will have cycles 5, 6, 7 and 8 absent from its pre-count groups, whereas all other channels of recorded data will contain the full eight pre-count cycles. The addressing scheme may be altered to meet program requirements. In addition, the capacity of counter 9 may be expanded to provide additional information such as polarity.

This completes the description of the writing mode of operation. There remains a discussion of the means for displaying the data while it is being written on tape. A buffer 49 is connected to the counter 11. If the buffer 49 is pulsed by gate 51 at the set input, the number that the counter 11 has counted to at the time the set pulse is applied will be stored in buffer 49. The buffer 49 will continue to store this number until a new set pulse is applied regardless of what happens to the counter 11. Gate 51 receives a pulse from flip-flop 41 which is controlled by gate 35. The opening and closing of gate 51 is controlled by the output of gate 55. One input of gate 55 is satisfied when counter 11 is counting since a positive logic level is present at the 8 stage of counter 9 and this positive level is applied to one input of gate 55. The second input to gate 55 is a function of the channel selector switch 57. By means of the channel selector switch 57, either of the analog comparisons may be applied through gate 51 to set the buffer 49. The binary coded decimal stored in the buffer 49 is applied to a binary coded decimal to decimal converter 59 the output of which is presented at display 61 as a digital representation of the analog channel selected by the channel selector switch 57. The output of buffer 49 may also be applied to a digital to analog converter 63 the output of which is then amplified by amplifier 65 to provide an analog output. The analog and digital outputs provided can be applied to recorders, printers, etc., as required.

OPERATION AND CONSTRUCTION OF PLAY-BACK SYSTEM

Referring to the schematic illustration, the end of burst detector 67 receives the recorded bursts from the tape recorder and develops a pulse at the end of each data burst. For analog inputs to comparator 23, representing analog channel 1, the end of burst detector 67 will develop two output pulses. One pulse will follow the fourth pre-count pulse since pre-count pulses 5, 6, 7 and 8 are absent. The second pulse will follow the end of the data burst. For data bursts representing any analog input channel other than channel 1, the end of burst detector 67 will develop a pulse at the end of the data burst only because pre-count pulses 5, 6, 7 and 8 are present.

The shaper 69 receives the bursts from the tape recorder and shapes each pulse so that it is suitable for operating blocking oscillator 3 which drives the pre-counter 9 and counter 11 as has been described in the discussion relative to recording. Detecting the presence of a channel address is accomplished by gate 71. The gate input to gate 71 is from the fourth stage of pre-counter 9. When the output of blocking oscillator 3 passes through gate 5 and advances the pre-counter 9 to 4, gate 71 opens. An end burst will appear at the input of gate 71 following the pre-count of 4 when a channel 1 burst is coming from the tape recorder. This will not be true for other than channel 1 bursts since all 8 pre-count pulses are present.

The output at gate 71 indicates that a channel 1 address has come off the tape and also causes the pre-counter 9 to advance to 8 thereby setting the 4, 2 and 1 stages of the counter to zero. The action of advancing the pre-counter 9 to 8 opens gate 7, closes gate 5 and closes gate 71. The output of gate 71 passes through gate 31 to the 1 side of the frame counter 37 which will be used for sorting the data coming from the tape. This logic check insures that the frame counter 37 is in the proper state to sort the upcoming channel 1 data. After pre-counter 9 has advanced to 8, counter 11 counts up the number of cycles above 8 which is equal to the data value.

Gate 51 sets in the buffer 49, the data value which is present in counter 11. Gate 51 receives input pulses from the end of burst detector 67 and a control input from gate 55 which controls the opening and closing of gate 51. The inputs to gate 55 are supplied by the pre-counter 9 and the frame counter 37 through the channel selector switch 57. By use of the channel selector switch 57, analog channels 1 or 2 may be selected for playback. For the purpose of the following discussion, channel 1 will be selected. The end of burst output occurring at the end of the data count into the counter 11 passes through gate 51 and this end of burst output sets the counter 11 data value into the buffer 49. This data value can then be read out as either an analog or digital value for inputs to associated equipment, or it can be displayed in digital form in display 61. The pre-counter 9 and the counter 11 are now reset to zero and the frame counter 37 is reversed by gate 73 in preparation for the next burst which will be an analog channel 2 burst. Gate 73 received an output from the end of burst detector 67 at the conclusion of the prior data burst, and gate 73 is opened by its other input which occurs when the pre-counter 9 reaches a count of 8. The output of gate 73 sets the pre-counter 9 and the counter 11 to zero and reverses the frame counter 37 through the read-write selector switch 39*a* and gate 31.

The next burst, a channel 2 burst, passes through the shaper 69, the blocking oscillator 3 and the gate 5 to pre-counter 9. On the eighth count of pre-counter 9, gate 5 closes and gate 7 opens and counter 11 counts up the data value. No address end of burst pulse appears at the output of gate 71 because pulses 5, 6, 7 and 8 are present. No output will appear at the output of gate 51 to set channel 2 value into the buffer 49 because gate 51 is controlled by gate 55 and one input to gate 55 is controlled by the channel selector switch 57 and we have previously selected analog channel 1 for readout. The frame counter 37 reversed at the end of the analog 1 data, and therefore the other input to gate 55 will not allow gate 55 to open gate 51 during analog 2 bursts.

At the conclusion of the analog 2 data burst, the pre-counter 9 and the counter 11 are reset to zero and the frame counter 37 is reversed by the output of gate 73 as previously described. The system is now ready to accept the next data burst which will be an analog 1 burst. This burst will be processed as described previously and the new value for analog 1 will be shifted into the buffer 49 and subsequently presented as digital and analog outputs.

If the channel selector switch 57 is placed in the analog 2 position, the operation will be the same as described up to this point except that one input to gate 55 is now coming from the opposite side of the frame counter 37; therefore, gate 55 will allow gate 51 to open only during analog 2 bursts. Analog 2 values will, therefore, appear on the display 61 and at the decimal and analog outputs.

The operation of pre-counter 9 serves a twofold purpose. In addition to providing a means to address the serially stored data, it functions as a means of preventing spurious signals from disrupting the read mode of operation. This latter function of pre-counter 9 is accomplished by supplying the control inputs to gates 51, 55, 71 and 73 from either the 4 stage or the 8 stage of pre-counter 9. In the case of channel 1 data, a four count is required to open gate 71 whereas gates 51, 55 and 73 require an eight count in pre-counter 9. Thus it is apparent that the presence of less than four spurious signals from the tape in the case of channel 1 data or less than eight spurious signals in the case of all other channels will not cause an erroneous set signal to buffer 49 or advance signal to frame counter 37. The presence of such a spurious signal would result in an incorrect count in counter 11, but an error of one count in two hundred would be minimal.

For the purpose of clear and concise discussion of our invention, we have refrained from discussing state of the art circuitry which would protect the system operation from analog signal levels exceeding the capacity of the staircase voltage generator 14. The inclusion of such circuitry, which would be obvious to one skilled in the art, would not affect the invention which we have disclosed.

What we claim as new and desire to secure by Letters Patent of the United States is:

1. A data recording system for converting a plurality of analog voltage inputs into a plurality of coded bursts of sinusoidal cycles suitable for magnetic recording and play back, the system comprising:

a sine wave oscillator having phase related first and second sinusoidal outputs, the first output being adapted to be recorded and the second output being adapted to be counted;

means, responsive to the second output, for counting a predetermined number of address cycles to identify the respective analog voltage input being converted and for counting measuring cycles to establish a discreet voltage output corresponding to the respective analog voltage input being converted;

first logic circuit means, responsive to said counting means, for gating the first output from said sine wave oscillator to the magnetic recording medium only when the second output from said oscillator is being counted; and, second logic circuit means, responsive to the sinusoidal cycles recorded on the magnetic recording medium, for conditioning said first logic circuit means and for resetting said counting means to reestablish the discreet voltage output for each respective analog voltage input.

2. A data recording system as in claim 1 in which said second logic circuit means includes a selector switch to position the system in a record mode or a play back mode, an end of burst detector which generates a cycle at the end of each measurement burst as it comes off the magnetic medium and, in the case of the first analog channel generates a cycle at the end of the address cycles, said first logic circuit means includes a frame counter which is logically conditioned by the address cycles for the system to accept measurement cycles recorded from the proper analog channel, said counting means includes a binary coded decimal counter which counts the measurement burst of cycles from the magnetic medium, a channel selector switch is positioned to permit the measurement of the selected analog channel to be set from said counter to a buffer by the end of measurement cycle, said buffer having an output which supplies inputs to an analog to digital converter and a binary coded decimal-to-decimal driver which produces analog and decimal outputs respectively.

3. A data recording system as in claim 1 in which the means for counting each measurement burst of cycles as it is recorded on magnetic tape comprises a pre-counter which counts a predetermined number of address cycles to said recording tape prior to each measurement burst, the number of address cycles being established by gating from the pre-counter and the frame counter.

4. A data recording system as claimed in claim 3 wherein said pre-counter and said first and second logic circuit means are interconnected to control the operation of the system playback mode.

5. A data recording system as in claim 1, wherein said first logic circuit means includes a staircase voltage generator which generates a discreet voltage output proportional to the number of measuring cycles counted by said counting means and a plurality of voltage comparators, one said comparator connected to each of said plurality of analog voltage inputs, said staircase generator output voltage being compared with the respective analog voltage input being converted in order to provide a trigger pulse output when they are equal.

6. A data recording system as in claim 5, wherein said first logic circuit means additionally includes a selector switch to position the system in a record mode or a play back mode, a frame counter to sequentially gate the trigger pulse from each of said comparators, means responsive to the trigger pulses sequentially gated from said comparators for controlling the number of sinusoidal cycles recorded on the magnetic recording medium when said selector switch is set to the record mode, and a conventional tape recorder to record and play back the gated sinusoidal cycles from said sine wave oscillator.

References Cited

UNITED STATES PATENTS

| | | | |
|---|---|---|---|
| 2,700,750 | 1/1955 | Dickinson | 340—347 X |
| 3,134,957 | 5/1964 | Foote et al. | 340—347 X |

OTHER REFERENCES

Hollander, Gerhard L.: "A Digital Data Recorder for Storage of Continuous Voltages," Electrical Engineering, July 1954, pp. 253–259.

BERNARD KONICK, Primary Examiner

R. S. TUPPER, Assistant Examiner

U.S. Cl. X.R.

340—174.1, 347